Figure 1:
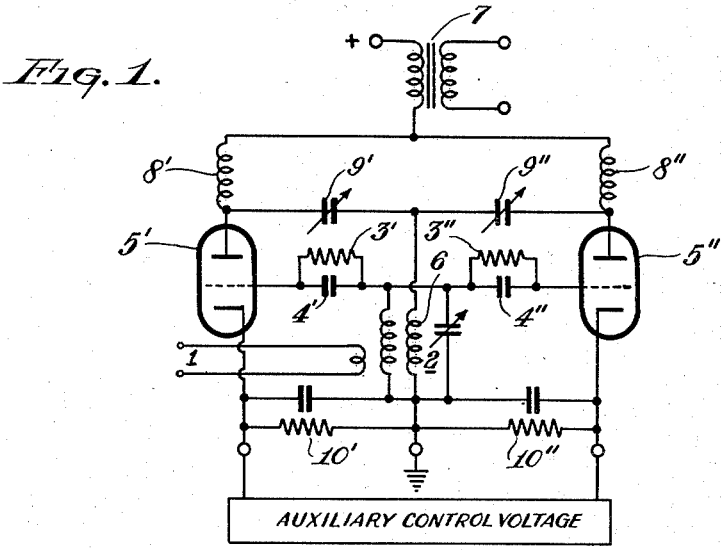

Oct. 10, 1950     H. DE LANGE     2,525,529

CIRCUIT-ARRANGEMENT FOR SUPERREGENERATIVE RECEPTION

Filed Jan. 8, 1947

HENDRIK DE LANGE
INVENTOR.

BY

ATTORNEY.

Patented Oct. 10, 1950

2,525,529

UNITED STATES PATENT OFFICE 2,525,529

CIRCUIT ARRANGEMENT FOR SUPER-REGENERATIVE RECEPTION

Hendrik de Lange, Eindhoven, Netherlands, assignor to Hartford National Bank and Trust Company, Hartford, Conn., as trustee Application January 8, 1947, Serial No. 720,733
In the Netherlands December 8, 1945

Section 1, Public Law 690, August 8, 1946
Patent expires December 8, 1965

5 Claims. (Cl. 250—20)

This invention relates to a circuit-arrangement for the super-regenerative reception of electrical oscillations, and more particularly to the super-regenerative reception of ultra high-frequency oscillations, for example 15 meters, in which the auxiliary oscillation is preferably produced by a separate generator.

The conventional circuit-arrangements for super-regenerative reception of electrical oscillations have a limitation in that the selectivity is comparatively low. This is due to the fact that the selectivity is determined by a single resonant circuit.

In order to improve the selectivity, it has been proposed to maximize the time during which the effective resistance of the input resonant circuit has a value of approximately zero. However, a circuit-arrangement in which this idea is reduced to practice has hitherto not been provided.

The principal object of the present invention is to provide a circuit-arrangement, the selectivity of which is appreciably improved by using the said principle.

According to the invention, the input resonant circuit is less positively damped during the whole quenched period or during part of this period immediately prior to the oscillation period. Moreover, the oscillation and the less positive damping are effected by means acting independently of one another.

Owing to the said less positive damping, the resistance of the circuit can be materially reduced during the whole quenched period or during a large part of it, as a result of which the selectivity of the circuit-arrangement is materially improved.

Hitherto, effort has never been purposely directed towards damping the input resonant circuit less positively during the quench period. In some of the conventional circuit-arrangements for super-regenerative reception random less positive damping of the resonant circuit may occur during part of the quenched period.

So far as such less positive damping might exist, however, the less positive damping and oscillation are not obtained by using means acting independently of one another.

Owing to the use of separate means for damping and oscillation, the circuit-arrangement can be adjusted in a very easy manner, notably as regards to the control of selectivity, the degree of oscillation and the improvement of quenching.

If use is not made of independent means to obtain the desired damping and oscillation, it appears difficult in practice to create a satisfactorily operating circuit, since in this case various parts of the circuit must meet more or less contradictory requirements.

The circuit is preferably adjusted in such manner that the input resonant circuit is less positively damped to a maximum and that the less positive damping takes place evenly during the whole quenched period. However, the less positive damping should not be increased to such an extent as to cause instability of the circuit during the quenched period. Moreover, the less positive damping should be chosen so that, at the frequency of the auxiliary oscillation used, satisfactory quenching is achieved.

The circuit-arrangement may advantageously be designed in such manner that oscillation and less positive damping are performed individually by separate discharge systems. These discharge systems are preferably caused to influence the input resonant circuit alternately in such manner that one system is operative during the whole quenched period, whereas the other system is operative during the entire oscillation period.

In conjunction therewith, it is possible to use a square, trapezoidal or rectangular wave of auxiliary voltage. If one of these is used, the moment at which the discharge systems become operative is exactly fixed.

Alternatively, oscillation and damping may be brought about by a single discharge system. If the discharge system consists of a discharge tube having a cathode, a control-grid and at least three additional electrodes, two of the outer electrodes may be connected respectively to circuits causing oscillation and less positive damping and the auxiliary oscillation may be applied to the third additional electrode.

The auxiliary oscillation is preferably produced by a separate generator. In certain cases it is possible, however, to produce this oscillation by means of part of one or more discharge systems that are also used for super-regenerative reception. For example, if use is made of a discharge tube having two or more grids, such as a hexode, some of the electrodes of the discharge system may be used in a circuit for producing the auxiliary oscillation. The duration of the oscillation period should correspond approximately to that of the quenched period.

Figure 2:
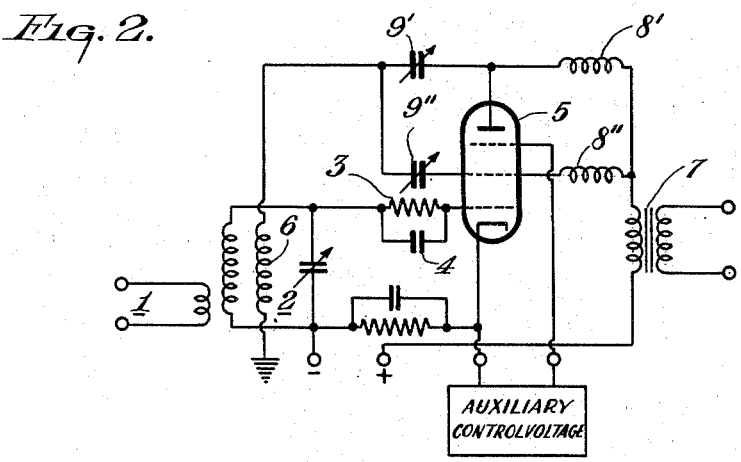

In order that the invention may be clearly understood and readily carried into effect, it will now be described more fully with reference to the accompanying drawing, in which:

Fig. 1 shows a circuit arrangement in accordance with the invention in which two tubes are employed, and Fig. 2 shows a circuit arrangement in accordance with the invention employing a single tube.

Fig. 1 represents a circuit-arrangement for super-regenerative reception of electrical ultra high-frequency oscillations, for example 15 meters, in which the invention is used. These oscillations are supplied to terminals 1 and, through inductive coupling, to the input resonant circuit 2. The resonant circuit 2 is connected, through the parallel-connection of a resistance 3' and a condenser 4', to the control-grid of a triode 5' and, through the parallel-connection of a resistance 3" and a condenser 4", to the control-grid of a triode 5". The anodes of the two triodes are interconnected through two high-frequency chokes 8' and 8" and through two adjustable condensers 9' and 9". The junction of the said chokes is connected through the primary winding of an audio frequency transformer 7, to the positive terminal of an anode voltage supply (not shown). The junction of condensers 9' and 9" is grounded through a feed-back coil 6. The audio frequency output voltage of the circuit can be obtained from the secondary winding of transformer 7.

Two resistances 10' and 10" are connected in series between the cathodes of the discharge tubes 5' and 5". The junction of these resistances is connected to the bottom end of circuit 2 and, at the same time, to ground. The auxiliary voltage is applied to the remote ends of the resistances 10' and 10". This voltage may advantageously have a rectangular variation, as explained, and may be obtained from a multivibrator.

The circuit-arrangement operates as follows:

The discharge tubes 5' and 5" are alternately rendered conductive and nonconductive in phase with the auxiliary oscillation; 5' functioning as the tube causing oscillation and 5" as the tube effecting the less positive damping. The degree of oscillation during the quenched period and the measure of damping applied during the interruption period can be controlled independently by adjustment of the feedback condensers 9' and 9". Consequently, oscillation and less positive damping are obtained by means operating completely independently of one another. The circuit is adjusted in such manner that, during one part of the period of application of the auxiliary voltage, the circuit tends to oscillate and, during the other part of this period damping of the input resonant circuit is increased to the maximum practical value. In this respect the following is pointed out:

If no incoming signal is supplied to the circuit, the oscillation should be initiated each time by the noise voltage, the amplitude of which is about $10^{-6}$ volts. Moreover, to ensure satisfactory circuit operation, inter alia: a satisfactory automatic gain control, the oscillations generated must be capable of growing to the saturation value; approximately 10 volts. Consequently, the circuit should be adjusted in such manner that, during the oscillation period, the oscillations are able to grow by a factor $10^7$, and that, during the quenched period, the generated oscillations are capable of falling below noise level (consequently by a factor of $10^{-7}$). When the frequency of the auxiliary voltage is once fixed, the condensers 9' and 9" can be adjusted to fulfill the aforesaid condition.

For telephony reception the frequency of the auxiliary oscillation is generally 20 kc./s. at a minimum. This means that at a wavelength of 15 meters of the oscillations to be received, approximately 1000 high-frequency oscillations are available, in all, for a complete quenched period. In conjunction with the aforesaid amplitude variation of the order of magnitude of $10^7$ the quality of the input resonant circuit, during the quenched period $Q_1$ and the absolute value of the quality of this circuit during the oscillation period $Q_2$ may not be chosen so as to exceed 100. If the quality of the input resonant circuit is lower than about 100, the Q of the circuit can be improved to a value of approximately 100 by reducing the damping. This reduction of damping may be effected by adjustment of condenser 9". The absolute value of the Q of the circuit during the oscillation period may be given a suitable value, for example, 100, thru adjustment of the condenser 9'. It should be remembered that the selectivity of the circuit-arrangement also depends upon the absolute value of the Q of the circuit during the oscillation period. Consequently, the discharge system must not exhibit too high a negative resistance for the resonant circuit during the oscillation period.

Reception of telephony waves of 1.5 meters allows ten times more high-frequency oscillations per interruption period than in the prior case as a result, the circuit Q may amount approximately to 1000. In this case, a very large less positive damping can usually be used, with the result that the selectivity of the circuit can be raised to a high degree. The adjustment, however, should always be effected in such a manner that quenching remains satisfactory.

The leakage resistance 3' and the grid condenser 4' perform various functions simultaneously; primarily they are instrumental in detecting the high-frequency oscillations and secondly they limit the amplitude of the generated oscillation by automatic class-C adjustment. Moreover, their presence ensures a smooth and gradual initiation of the oscillation; this being increased by the fact that the direct current pulses, due to blocking and opening of tubes 5' and 5", are not able to affect the resonant circuit 2. Moreover, these pulses compensate one another, because the tubes 5' and 5" are alternatively operative, so that practically no variation of the direct current supply occurs in the lead comprising the primary winding of transformer 7.

It is desirable that the negative charge, which gradually builds-up across the grid condenser 4' in an oscillation period, should be entirely dissipated during the next interruption period. This occurs if $$R_1 \cdot Cr = \frac{1}{f_p}$$

where $R_1$ = value of leak resistance 3',
$Cr$ = capacity of grid condenser 4' and
$f_p$ = frequency of the auxiliary voltage $R_1$ and $Cr$ should, moreover, be so chosen that a sufficient high-frequency voltage is set up at the control-grid and that the production of relaxation oscillations is avoided.

In the circuit-arrangement as described, detection is likewise effected by means of tube 5'; in principle, however, this function may be performed by another tube.

Fig. 2 shows a circuit which retains the possibility of separate adjustment of the circuit Q: $Q_1$ and $Q_2$, and yet, the two tubes 5' and 5" are replaced by a single tube. In this case the auxiliary voltage is fed to the suppressor grid of a pentode. The tube current flows almost wholly either to the anode during the oscillation period, or to the screen-grid during the quenched period. The control of the circuit qualities, $Q_1$ and $Q_2$, is effected by adjustment of condensers 9" and 9'.

The functions of the anode and of the screen grid may be interchanged. By supplying the direct voltage supply for anode and screen-grid through the same primary winding of the audio-frequency transformer 7, occurrence of the auxiliary voltage in the output circuit is avoided and reaction on the resonant circuit through the feed-back coil 6 is prevented.

What I claim is.

1. A super regenerative demodulator for high frequency signals, comprising an electron discharge system having a cathode, an input electrode and first and second output electrodes, a tuned oscillatory circuit having a given damping coupled between said input electrode and said cathode, means to apply said signals to said oscillatory circuit, an output circuit coupled to said output electrodes, first feedback means coupled to one of said output electrodes and to said oscillatory circuit in regenerative relationship at the frequency of said signals to produce oscillations in said oscillatory circuit, second feedback means coupled to said other output electrode and to said oscillatory circuit in regenerative relationship at the frequency of said signals to reduce the damping of said oscillatory circuit without producing oscillations in said oscillatory circuit, a source of auxiliary control oscillations, and means to apply said control oscillations to said discharge system alternately to render said first and second feedback means operative in synchronism with said control oscillations.

2. A super regenerative demodulator for high frequency signals, comprising two electron discharge tubes each having a cathode, an input electrode and an output electrode, a tuned oscillatory circuit having a given damping coupled between said input electrodes and said cathodes, means to apply said signals to said oscillatory circuit, an output circuit coupled to said output electrodes, first feedback means coupled to the output electrode of one of said tubes and to said oscillatory circuit in regenerative relationship at the frequency of said signals to produce oscillations in said oscillatory circuit, second feedback means coupled to the output electrode of said other tube and to said oscillatory circuit in regenerative relationship at the frequency of said signals to reduce the damping of said oscillatory circuit without producing oscillations in said oscillatory circuit, a source of auxiliary control oscillations, and means to apply said control oscillations to said discharge tubes alternately to render said first and second feedback means operative in synchronism with said control oscillations.

3. A super regenerative demodulator for high frequency signals, comprising two electron discharge tubes each having a cathode, an input electrode and an output electrode, a tuned oscillatory circuit having a given damping coupled between said input electrodes and said cathodes, means to apply said signals to said oscillatory circuit, an output circuit coupled to said output electrodes, first feedback means comprising an inductor and a first capacitor and coupled to the output electrode of one of said tubes and to said oscillatory circuit in regenerative relationship at the frequency of said signals to produce oscillations in said oscillatory circuit, second feedback means comprising said inductor and a second capacitor and coupled to the output electrode of said other tube and to said oscillatory circuit in regenerative relationship at the frequency of said signals to reduce the damping of said oscillatory circuit without producing oscillations in said oscillatory circuit, a source of auxiliary control oscillations, and means to apply said control oscillations to said discharge tubes alternately to render said tubes conductive and non-conductive thereby alternately to render said first and second feedback means operative in synchronism with said control oscillations.

4. A super regenerative demodulator for high frequency signals, comprising an electron discharge tube having a cathode, a control grid, and first and second output electrodes, a tuned oscillatory circuit having a given damping coupled between said control grid and said cathode, means to apply said signals to said oscillatory circuit, an output circuit coupled to said output electrodes, first feedback means coupled to one of said output electrodes and to said oscillatory circuit in regenerative relationship at the frequency of said signals to produce oscillations in said oscillatory circuit, second feedback means coupled to said other output electrode and to said oscillatory circuit in regenerative relationship at the frequency of said signals to reduce the damping of said oscillatory circuit without producing oscillations in said oscillatory circuit, a source of auxiliary control oscillations, and means to apply said control oscillations to said discharge tube alternately to render said first and second feedback means operative in synchronism with said control oscillations.

5. A super regenerative demodulator for high frequency signals, comprising an electron discharge tube having a cathode, a control grid, a screen grid, a suppressor grid and an anode, a tuned oscillatory circuit having a given damping coupled between said control grid and said cathode, means to apply said signals to said oscillatory circuit, an output circuit coupled to said screen grid and said anode, first feedback means comprising an inductor and a first capacitor and coupled to said anode and to said oscillatory circuit in regenerative relationship at the frequency of said signals to produce oscillations in said oscillatory circuit, second feedback means comprising said inductor and a second capacitor and coupled to said screen grid and to said oscillatory circuit in regenerative relationship at the frequency of said signals to reduce the damping of said oscillatory circuit without producing oscillations in said oscillatory circuit, a source of auxiliary control oscillations, and means to apply said control oscillations to said suppressor grid to vary the current distribution between said screen grid and said anode thereby alternately to render said first and second feedback means operative in synchronism with said control oscillations.

HENDRIK DE LANGE.

REFERENCES CITED

The following references are of record in the file of this patent:

UNITED STATES PATENTS

| Number | Name | Date |
| --- | --- | --- |
| 1,948,315 | Van Roberts | Feb. 20, 1934 |
| 1,982,694 | Roberts | Dec. 4, 1934 |
| 2,030,120 | Rust | Feb. 11, 1936 |
| 2,212,182 | Paddle | Aug. 20, 1940 |
| 2,214,710 | Bradley | Dec. 17, 1946 |
| 2,415,316 | Wheeler | Feb. 4, 1947 |

FOREIGN PATENTS

| Number | Name | Date |
| --- | --- | --- |
| 644,881 | France | June 19, 1928 |